Oct. 1, 1968  M. M. KNAPP ET AL  3,403,701

PRESSURE SEALING PIPE LINE PIG

Filed Dec. 27, 1966

MARY M. KNAPP
HARRY J. GIRARD
INVENTORS.

BY Charles E. Lightfoot
ATTORNEY

United States Patent Office 3,403,701
Patented Oct. 1, 1968

3,403,701
PRESSURE SEALING PIPE LINE PIG
Mary M. Knapp, 1209 Hardy St. 77020, and Harry J. Girard, 1947 W. Gray 77017, both of Houston, Tex.
Filed Dec. 27, 1966, Ser. No. 604,801
5 Claims. (Cl. 137—802)

This invention relates to pigs or swipes for use in pipe lines, and more particularly to a pig or swipe which is designed to be inserted in a pipe line to be propelled therethrough by a pressure gradient and which is shaped to form a fluid tight seal between the pig and the pipe under the influence of the pressure of fluid in the line.

The invention is capable of application for a number of different purposes in the operation and maintenance of pipe lines and finds particular utility in connection with the use of pipe lines for the transmission of fluids of different character for preventing the commingling of such fluids. For this purpose pigs or swipes of various types have been proposed which are intended to be inserted in a pipe line upon termination of the introduction of one type of fluid and preliminary to the introduction of another type, to maintain the fluids separate and to wipe the pipe clean of one fluid in advance of the movement of another fluid through the pipe to prevent contamination of one fluid by the other. Such pigs or swipes are also frequently employed for other purposes, such as the removal of corrosion or other foreign material from the pipe and for the application of coatings to the internal surface thereof.

The present invention has for an important object the provision of a pipe line pig or swipe which is shaped to be readily inserted in a pipe line for propulsion therethrough by a pressure gradient in the line and which is shaped to be acted upon by pressure in the line to form a fluid tight seal with the surrounding wall of the pipe.

Another object of the invention is to provide a pipe line pig which is shaped to provide an area of contact with fluid in the line such that, a portion of the force exerted by the pressure of said fluid against said area of contact directed substantially at right angles to the pipe wall, thus increasing the force of sealing contact between the pig and the pipe wall, and which is substantially greater than the cross-sectional area of the line, whereby the area of the pig which is exposed to the pressure of fluid in the line is greatly increased.

A furthr object of the invention is the provision of a pipe line pig embodying seal forming means positioned for sealing contact with the surrounding wall of the pipe and having a surface of greater area than the cross-sectional area of the pipe, exposed to the pressure of fluid in the pipe, the seal forming means being shaped to transmit the fluid pressure against the pipe wall in a direction substantially at right angles to the wall, whereby the sealing effect of the pig against the surrounding wall is greatly increased.

Another object of the invention is to provide a pipe line pig formed of resilient material having an end cavity forming an annular flexible lip positioned to be expanded into sealing contact with the surrounding wall of the pipe under the influence of the pressure of fluid in the pipe and to provide an end face on the pig of greater area than the cross-sectional area of the pipe.

Briefly described, the pig or swipe of the invention comprises a generally cylindrically shaped body, preferably formed of resilient material having at one or both ends a rounded, longitudinally outwardly opening recess or cavity forming an annular lip positioned for sealing contact with the surrounding wall of the pipe whereby the sealing pressure exerted by the lip against the pipe will be increased upon an increase in the pressure of fluid in the pipe.

The above and other obvious objects and advantages of the invention will be apparent from the following detailed description of the same when considered in conjunction with the annexed drawings, wherein—

Figure 1:
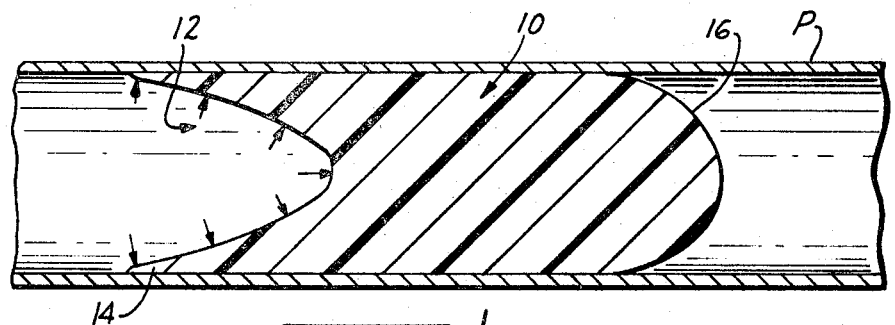
FIGURE 1 is a longitudinal, central, cross-sectional view of a preferred embodiment of the pig or swipe of the invention, showing the same in use in a pipe line.

Referring now to the drawings in greater detail, the pig or swipe of the invention, as illustrated in FIGURE 1, takes the form of a generally cylindrically shaped body 10, formed of a suitable resilient material, such as rubber, foamed plastic, or the like, which will be of somewhat larger diameter than the internal diameter of the pipe P, in which the pig or swipe is to be inserted, before insertion therein and formed at one end with a longitudinally outwardly opening, rounded, end cavity or recess 12, providing an annular, flexible, tapered, lip portion 14. The other end of the body 10 may be rounded or otherwise suitably shaped, as shown at 16 to facilitate the insertion of the device in the pipe.

Figure 2:
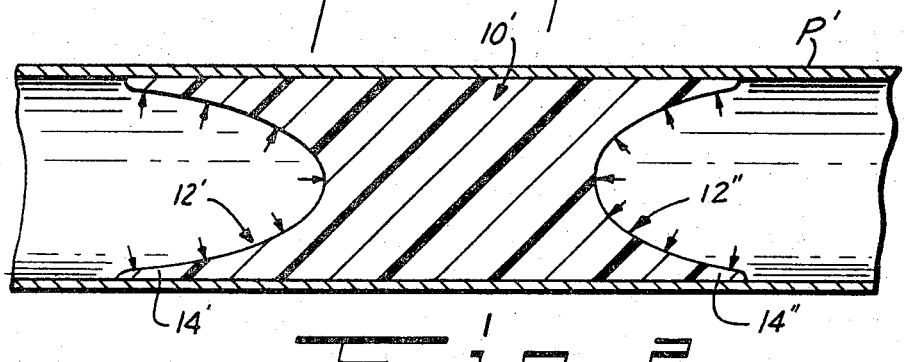
FIGURE 2 is a view similar to that of FIGURE 1 illustrating a somewhat different form of the invention.
Figure 3:
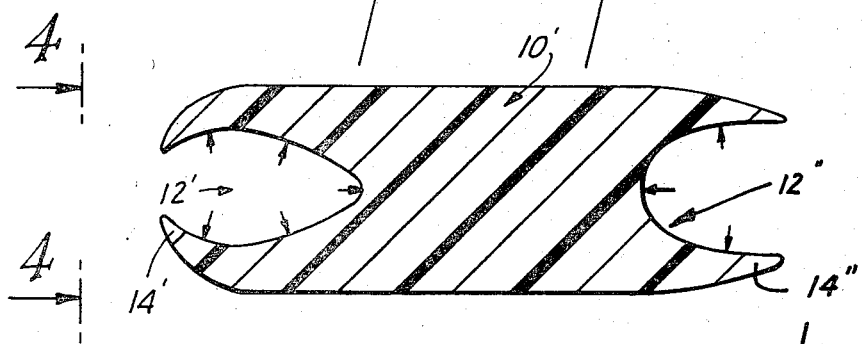
FIGURE 3 is a longitudinal, central, cross-sectional view of the pig or swipe of FIGURE 2 showing the configuration of the same prior to insertion of the device in a pipe line.
Figure 4:
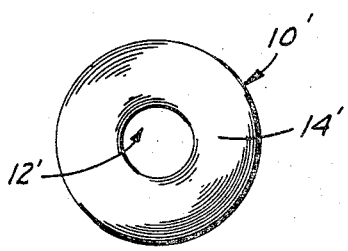
FIGURE 4 is an end view looking at the left hand end of the invention as illustrated in FIGURE 3.

A somewhat different form of the pig or swipe of the invention is illustrated in FIGURES 2, 3 and 4, wherein the body 10' is similar to the body 10 of the form of the invention shown in FIGURE 1, but is provided at both ends with cavities or recesses similar to the recess 12. Thus, the body 10' has at one end a longitudinally outwardly opening cavity 12' forming the annular flexible lip 14', and at the other end has a similar cavity 12" forming an annular lip 14".

Both of the above described forms of the invention will have the general shape shown in FIGURE 3 before insertion in a pipe line, the pig having a diameter somewhat larger than the internal diameter of the pipe into which it is to be inserted and the end lip or lips being curved or retracted inwardly, as shown in FIGURE 3, to form rounded end faces which facilitate the insertion of the pig in the pipe. Before insertion of the pig in the pipe the end cavity or cavities will also be in a contracted condition and of reduced diameter as shown in FIGURE 3.

In making use of the invention, the pig or swipe is inserted endwise into the pipe, the body being somewhat compressed diametrically thereby, whereby the device has a tight fit in the pipe. By introducing fluid under pressure into the pipe behind the pig, the same may then be propelled through the pipe, the pressure of the fluid in the end cavities serving to expand the seal forming lips into tight sealing contact with the surrounding wall of the pipe, as shown in FIGURES 1 and 2.

It will be apparent that the pressure of fluid in the pipe will be exerted against the internal surface of the end cavities at all points therein at right angles to such surface, so that as the pressure in the pipe increases the pressure on the lip tending to expand the same against the surrounding wall of the pipe will be increased. Moreover, because the area within the end cavities of the pig is greater than the cross-sectional area of the pipe a greater effective area is presented against which the pressure of the fluid will be exerted to expand the lips against the pipe.

In the form of the invention illustrated in FIGURE 2 the pressure of the fluid in advance of the pig will also be exerted against the lip 12" so that the lips at both ends of the pig will be effectively expanded into tight sealing contact with the pipe during the progress of the pig therethrough.

It will thus be seen that the invention, constructed and used as described above provides a pipe line pig or swipe whose sealing effect is increased with the increase in the pressure of fluid in the line, whereby the danger of leakage of fluid past the pig due to imperfections or irregularities occurring in the pipe line is greatly reduced.

The invention is disclosed herein in connection with particular embodiments of the same, which it will be understood are intended by way of illustration only, it being evident that various modifications can be made within the spirit of the invention and the scope of the appended claims.

Having thus clearly shown and described the invention, what is claimed as new and desired to secure by Letters Patent is:

1. In a pipe line swipe adapted to be propelled through a pipe by a pressure gradient an elongated body of cylindrical shape formed of resilient material having a longitudinally outwardly opening end cavity forming a flexible, annular lip portion whose external peripheral surface is positioned to be expanded into sealing engagement with the surrounding internal surface of the pipe by the application of the pressure of fluid in the pipe against the internal surface of the cavity when the swipe is in the pipe, said external peripheral surface of said lip portion being curved radially inwardly longitudinally of said body.

2. The pipe line swipe as claimed in claim 1 wherein said body has a longitudinally outwardly opening end cavity at each end thereof each of which forms a flexible annular lip portion whose external peripheral surface is positioned to be expanded into sealing engagement with the surrounding internal surface of the pipe by the application of the pressure of fluid in the pipe against the internal surface of the cavity when the swipe is in the pipe.

3. The pipe line swipe as claimed in claim 1, wherein the diameter of said body is greater than the internal diameter of the pipe.

4. The pipe line swipe as claimed in claim 2, wherein said body is in sealing engagement with the internal surface of the pipe throughout substantially the entire length of the body when said lip portions are expanded.

5. In a pipe line swipe adapted to be propelled through a pipe by a pressure gradient an elongated body of cylindrical shape formed of resilient material having a longitudinally outwardly opening end cavity forming a flexible, annular lip portion whose external peripheral surface is positioned to be expanded into sealing engagement with the surrounding internal surface of the pipe by the application of the pressure of fluid in the pipe against the internal surface of the cavity when the swipe is in the pipe, the open end of said cavity being of smaller diameter when said lip portion is unexpanded than when said lip portion is expanded.

References Cited

UNITED STATES PATENTS 1,803,126    4/1931    Oberhuber _____ 15—104.06

ARNOLD ROSENTHAL, *Primary Examiner.*